United States Patent
Feng et al.

(10) Patent No.: US 8,086,044 B2
(45) Date of Patent: Dec. 27, 2011

(54) BLOCK-BASED ITERATIVE MULTI-PASS DATA FILLING TECHNIQUE FOR COMPOUND DOCUMENT COMPRESSION

(75) Inventors: Guotong Feng, Mountain View, CA (US); Michael J. Gormish, Redwood City, CA (US)

(73) Assignee: Ricoh Co., Ltd., Tokoyo (JP)

( * ) Notice: Subject to any disclaimer, the term of this patent is extended or adjusted under 35 U.S.C. 154(b) by 1068 days.

(21) Appl. No.: 11/509,865

(22) Filed: Aug. 25, 2006

(65) Prior Publication Data

US 2008/0050023 A1 Feb. 28, 2008

(51) Int. Cl.
*G06K 9/68* (2006.01)
(52) U.S. Cl. .................. 382/220; 382/232
(58) Field of Classification Search ............ 382/220, 382/232, 237
See application file for complete search history.

(56) References Cited

U.S. PATENT DOCUMENTS

| | | | | |
|---|---|---|---|---|
| 5,097,518 | A | * | 3/1992 | Scott et al. .......... 382/298 |
| 5,379,130 | A | * | 1/1995 | Wang et al. .......... 358/462 |
| 5,469,216 | A | * | 11/1995 | Takahashi et al. ........ 348/441 |
| 6,941,024 | B2 | | 9/2005 | Mukherjee |
| 2003/0043298 | A1 | * | 3/2003 | Ohtsuki et al. .......... 348/584 |
| 2003/0133617 | A1 | * | 7/2003 | Mukherjee ............ 382/239 |

OTHER PUBLICATIONS

European Office Action dated Oct. 15, 2008, Application No. 07 114 947.0-1522, 3 pgs.
European Search Report for EP Application No. EP 07 11 4947, mailed Nov. 26, 2007, 5 Pages.
Pavlidis et al., "Compressing the background layer in compound images, using JPEG and data filling", Single Processing Image Communication, Elseiver Science Publishers, Amsterdam, NL, vol. 20, No. 5, Jun. 2005, pp. 487-502, XP004890517, ISSN: 0923-5965.
Bottou, L., et al.: "High Quality Document Image Compression with DjVu," Journal of Electronic Imaging, vol. 7, No. 3, pp. 410-425, SPIE, 1998, (Jul. 1998).
Dequeiroz, R., et al.: "Optimizing block-thresholding segmentation for MRC compression," Proc. IEEE Intl. Conf. on Image Processing, ICIP, Vancouver, Canada, vol. II, pp. 597-600, Sep. 2000.
Dequeiroz, R., et al.: "On data filling algorithms for MRC layers," Proc. IEEE Intl. Conf. on Image Processing, ICIP, Vancouver, Canada, vol. II, pp. 586-589, Sep. 2000.
Thierschmann, M., et al.: "A Scalable DSP-Architecture for High-Speed Color Document Compression," Document Recognition and Retrieval VIII, Paul B. Kantor, Daniel P. Lopresti, Jiangying Thou, Editors, Proceedings of SPIE vol. 4307 (2001), San Jose, CA Jan. 2001.
Schwartz, E.: "JPM segmentation and fill study and new method," CRC-TR-0324, Feb. 18, 2004.
Mukherjee, D., et al.: "JPEG2000-Matched MRC Compression of Compound Documents," IEEE ICIP, 2002, pp. 73-76, 0-7803-7622-6 Palo Alto, California, (Sep. 2002).
Simard, P., et al.: "A Foreground/Background Separation Algorithm for Image Compression," Microsoft Research, One Microsoft Way, Redmond, Washington (10 pages), (Mar. 2004).

* cited by examiner

*Primary Examiner* — Vikkram Bali
*Assistant Examiner* — Eueng-Nan Yeh
(74) *Attorney, Agent, or Firm* — Blakely, Sokoloff, Taylor & Zafman, LLP

(57) ABSTRACT

A method and apparatus for data filling is disclosed herein. In one embodiment, the method comprises receiving an image and a mask associated with the image and performing a block-based, iterative multi-pass data filling process to fill a layer as part of compound document compression.

25 Claims, 11 Drawing Sheets

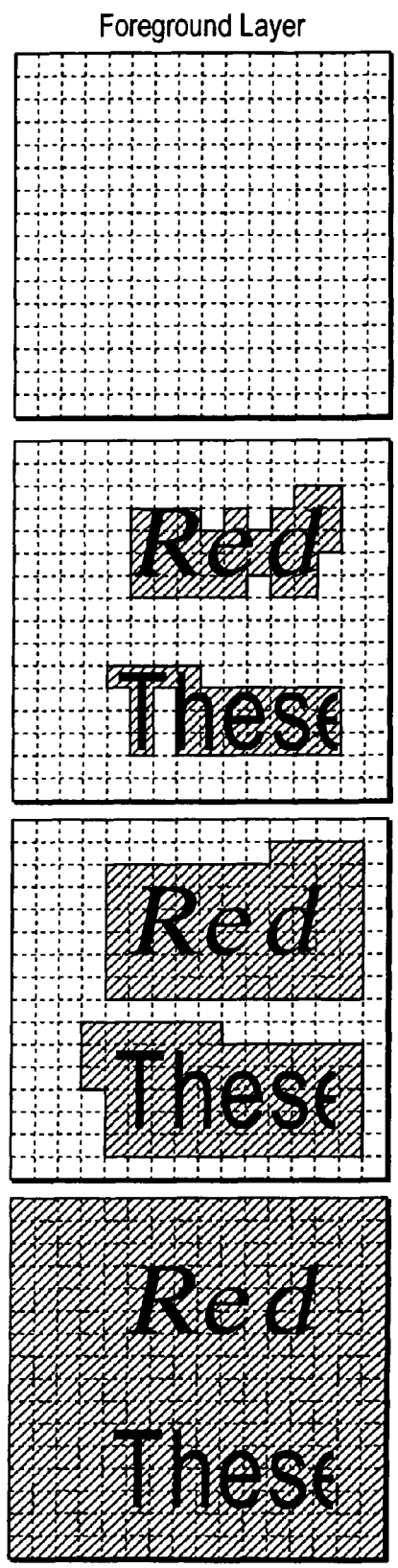
Foreground Layer
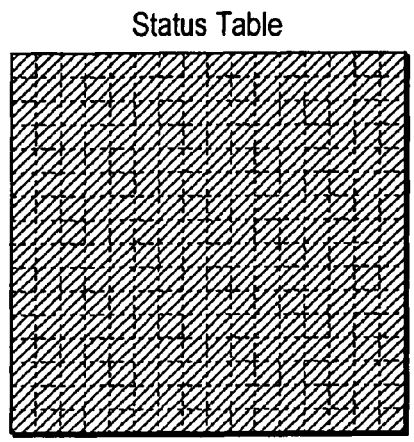
Zero Pass
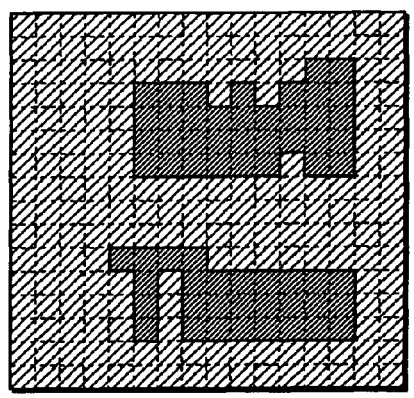
First Pass
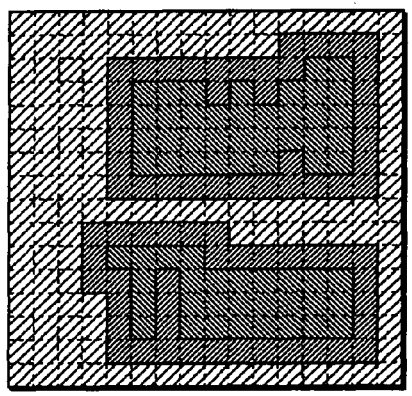
Second Pass
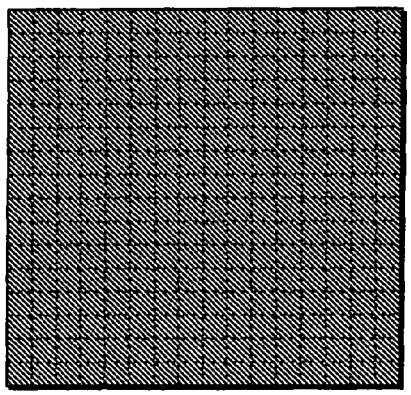
Final Pass
Status Table
(a)　　FIG. 5　　(b)

BLOCK-BASED ITERATIVE MULTI-PASS DATA FILLING TECHNIQUE FOR COMPOUND DOCUMENT COMPRESSION

FIELD OF THE INVENTION

The present invention relates to the field of compound document compression; more particularly, the present invention relates to a data filling technique for use in compound document compression.

BACKGROUND OF THE INVENTION

Mixed raster content (MRC) is an ITU standard (T.44) for compound document compression, where a document image is separated into multiple layers, and each layer is compressed by a specific encoder that is suitable for that layer. A typical 3-layer MRC document contains a binary mask, a foreground layer, and a background layer, where each pixel value of the mask is used to select between the foreground and background pixels in reconstructing the raster image. In general a 3-layer MRC encoder includes mask generation, data filling (foreground and background generation), foreground and background scaling, followed by separate compression of each layer.

While mask generation is critical, data filling is also very important for achieving high performance of compression. In general, a data filling method for an MRC-based encoder is required to fill in all the "don't care" pixels (i.e., irrelevant pixels for reconstruction) in both foreground and background layers. With lossless compression, "don't care" pixels affect only the bit rate. However, when lossy compression is used to obtain lower bit rates, poor choices of "don't care" pixels can change "care" pixels (i.e., relevant pixels for reconstruction) during decoding. Although "don't care" pixels are not directly relevant to the reconstruction of the image, the selection of values for these pixels may have significant impact on the rate-distortion performance of the compression. For example, suppose the don't care pixels in the foreground and background layers are filled in with a single color value. In this case, objectional ringing artifacts may occur in the decompressed image at the boundary of the foreground and background with any lossy compression such as JPEG and JPEG2000, and therefore the benefit of the MRC compression is significantly lost.

There are a number of approaches that have been proposed to solve these problems. These methods can be classified into three categories: spatial domain data fill; iterative frequency domain data fill; and mask dependent transform.

The spatial domain data fill approaches are generally simple and fast. The iterative frequency domain data fill approaches provide higher compression, but are more computationally expensive. The mask dependent transform approaches result in very high compression, but require interaction between mask and foreground/background for compression of the foreground and background layers and, thus, are not fully compliant with MRC.

More specifically there are several spatial domain data fill algorithms, some of which are described below. In one spatial domain data fill approach, multiple passes are performed in each block that contains a mixture of care and don't care pixels. In each pass, each unfilled pixel is determined by the average of the neighboring care pixels. This procedure is repeated until all "holes" are filled up. For more information, see De Querioz, "On Data-Filling Algorithms for MRC Layers," Proc. IEEE Intl. Conf. on Image Processing, ICIP, Vancouver, Canada, Vol. II, pp. 586-589, September 2000.

Another spatial domain data fill approach performs a coder matched layer separation method that includes a single pass block-based data filling algorithm for interpolation of don't care pixels. More specifically, for each block that contains a mixture of care and don't care pixels, the values of the don't care pixels are assigned based on the average of care pixels of that block. Each don't care block is filled by either a predefined value or the average value of the previous filled block. For more information, see U.S. Pat. No. 6,941,024, entitled "Coder Matched Layer Separation and Interpolation for Compression of Compound Documents," issued September 2005.

Another spatial domain data fill approach is implemented in LuraDocuments developed by Luratech. In this approach, foreground and background are generated at a reduced resolution by a factor of 3. In each 3×3 block that contains both care and don't care pixels, an average is taken of all care pixels except edge pixels. Then a 5×5 averaging filter is used to iteratively interpolate don't care pixels using these average values until all "holes" are filled up. This method does consider excluding edge pixels in averaging, thereby reducing ringing artifact. For more information, see Thierschmann, et al., "A Scalable DSP Architecture For High-Speed Color Document Compression," Document Recognition and Retrieval VIII, Kantor, et al., Editors, Proceedings of SPIE Vol. 4307 (2001), San Jose, Calif., January 2001.

Multi-resolution segmentation and fill (MSF) is a multi-resolution data fill algorithm used in the wavelet domain. The method uses a "lossy edge" idea that handles the edge effect for data filling. For more information, see U.S. patent Ser. No. 10/927,323, entitled "Multi-resolution Segmentation and Fill", filed Aug. 25, 2004.

SUMMARY OF THE INVENTION

A method and apparatus for data filling is disclosed herein. In one embodiment, the method comprises receiving an image and a mask associated with the image and performing a block-based, iterative multi-pass data filling process to fill a layer as part of compound document compression.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 illustrates an example of a data filling procedure.

DETAILED DESCRIPTION OF THE PRESENT INVENTION

Figure 1:
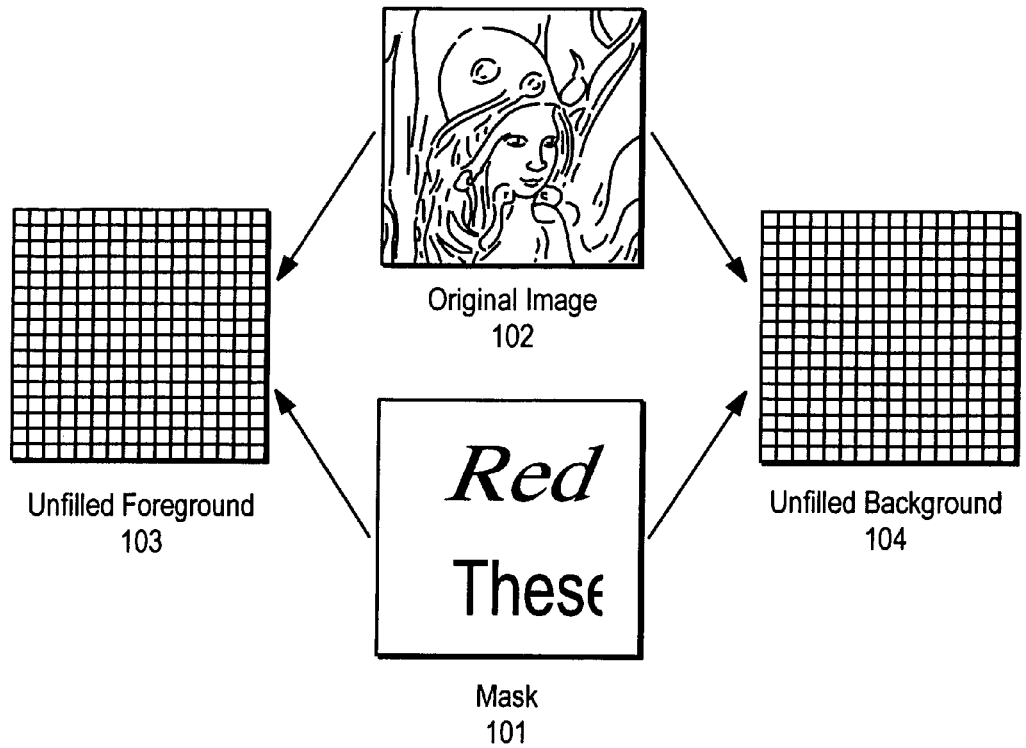
FIG. 1 is an example of an original image and mask with pointers to foreground and background layers.

A method, apparatus, and article of manufacture for data filling is described. In one embodiment, the data filling technique described herein generates image layers for compound document compression. This technique iteratively grows regions around the "care" pixels on a block-based scale to interpolate "don't care" pixels and edge pixels. This reduces, and potentially minimizes, the possibility of color discontinuity near the care pixel regions, and thereby minimizes ringing artifacts due to lossy compression.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A block-based, iterative multi-pass data filling technique is disclosed. The technique takes a mask and an original image as inputs and creates a filled foreground and background layers as outputs. FIG. 1 shows an example of a mask 101 and an original image 102, and the initially unfilled foreground layer 103 and background layer 104. In one embodiment, foreground layer 103 and background layer 104 are separated into 8×8 blocks. However, other block sizes may be used, including block sizes that are not square.

For ease, the following description only focuses on application of the techniques to one of the two layers (e.g., the foreground layer); however, it should be understood that the same applies to the other layer (e.g., the background layer).

For the foreground layer, for purposes herein, all the black pixels indicated in the mask are defined as "care" pixels, or relevant pixels, and all the white pixels as "don't care" pixels, or irrelevant pixels. In one embodiment, only the care pixels of the foreground layer will be used to reconstruct the decoded image.

Figure 2:
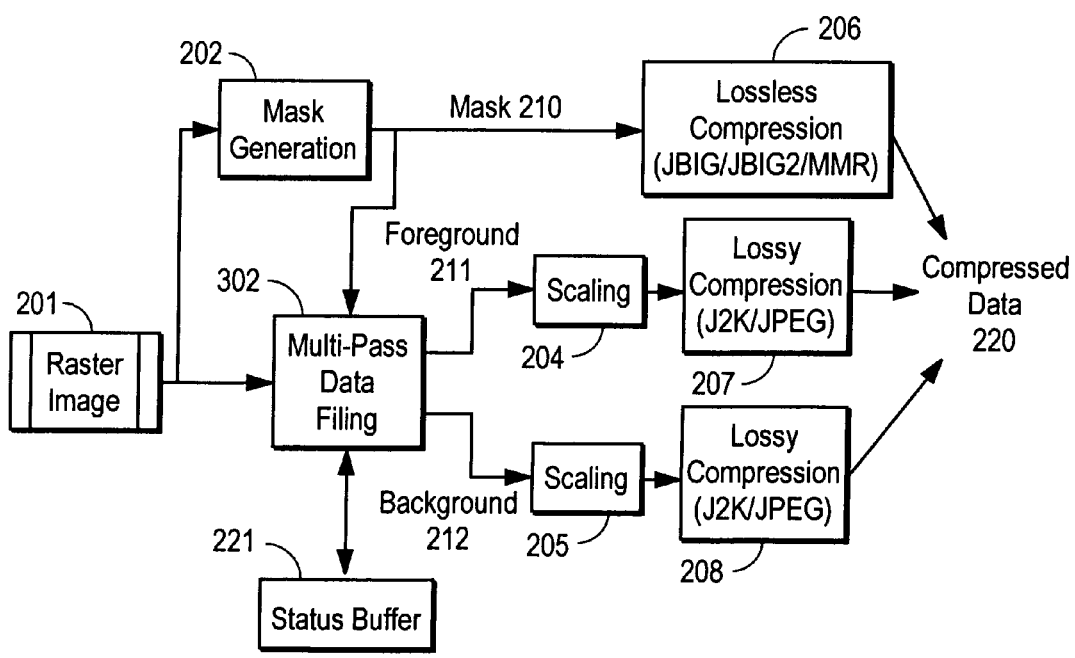
FIG. 2 is a block diagram of one embodiment of a compound document compression system.

FIG. 2 is a flow diagram of one embodiment of a compound document compressor. Referring to FIG. 2, raster image 201 is input to mask generation unit 202. In response thereto, mask generation unit 202 generates mask 210. Mask 210 undergoes lossless compression by lossless compression unit 206. In one embodiment, lossless/lossy compression unit 206 performs a well-known compression scheme, such as, for example, but not limited to, JBIG, JBIG2, MMR, etc. The output of lossless compression unit 206 is compressed mask data.

Mask 210 and raster image 201 are also input into multi-pass data filling unit 203. In response to these inputs, multi-pass data filling unit 203 performs a data filling operation and generates foreground layer 211 and background layer 212. In one embodiment, multi-pass data filling unit 203 performs a block-based, iterative multi-pass data filling process to generate background layer 212 and foreground layer 211 as part of compound document compression.

In one embodiment, the block-based, iterative multi-pass data filling process comprises performing block classification and then assigning values to pixels in a block based on their classification using an iterative process. In one embodiment, classifying blocks of pixels is performed by first classifying each pixel into one of two types: edge pixel and non-edge pixel, and then classifying blocks into different types in terms of appearance of edge pixels, don't care pixels, and care pixels in each block. One method for classifying pixels comprises: examining a pixel classification window centered around each pixel, determining if any pixels in the window have a different mask value than that pixel, and classifying that pixel as an edge if any pixels around that pixel in the window have a different mask value than that pixel. In one embodiment, this pixel classification window is a 3×3 window.

After classification, the assignment of values to the blocks occurs. In one embodiment, the assignment of values for each of one or more blocks (e.g., blocks with edges) of a layer (e.g., a foreground or background layer) is based on an average of pixel values in a window containing that block. In such a case, the window is larger than the block size. For example, in one embodiment, the window is 24 pixels by 24 pixels while the block size is 8 pixels by 8 pixels. In an alternative embodiment, the window size is rectangular in shape with at least one side that is not a multiple of the block size.

Note that the window size selection is based on one or more of a group consisting of: a compression algorithm for use in the compound document compression; a transform used in the compound document compression; and content of the image.

Returning to FIG. 2, in one embodiment, foreground layer 211 is scaled by scaling unit 204, which outputs a scaled foreground layer and background layer 212 is scaled by scaling unit 205.

After any optional scaling, foreground layer 211 is compressed using compressor 207. In one embodiment, compressor 207 performs lossy compression. In one embodiment, compressor 207 performs JPEG2000 compression. In another embodiment, compressor 207 performs JPEG compression. Compressor 207 outputs part of compressed data 220.

Also, after any optional scaling, background layer 212 is compressed using compressor 208. In one embodiment, compressor 208 performs lossy compression. In one embodiment, compressor 208 performs JPEG 2000 compression. In an alternative embodiment, compressor 208 performs JPEG compression. Compressor 208 outputs part of compressed data 220.

An Example of One Embodiment of a Data Filling Process

In one embodiment, the data filling process includes pixel classification, block classification, an initialization procedure, followed by multiple passes of processing blocks of data in a layer (e.g., foreground, background, etc.).

Figure 3:
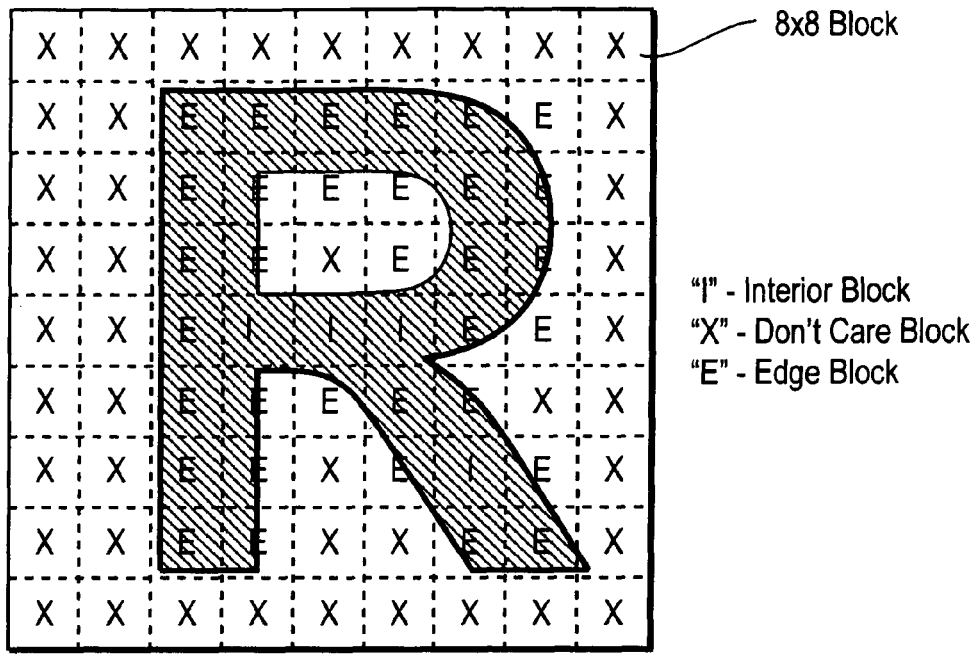
FIG. 3 illustrates an example for the three classification block types, including an interior block, a don't care block and an edge block.

With respect to block classification, in one embodiment, as an initialization, all the 8×8 blocks of the unfilled foreground layer are classified into one of 3 types using the mask image. These three types include an interior block, a "don't care" block, and an edge block. The interior block contains only the care pixels, the don't care block contains only don't care pixels, and the edge block contains a mixture of both care and don't care pixels. FIG. 3 shows an example for the 3 block types, where letter "I", "X", and "E" indicate interior, don't care, and edge blocks, separately, with respect to the "R" image appearing in the foreground layer.

In one embodiment, a data fill status table is maintained through the entire data filling process to keep track of the filling status of each block in each pass. In one embodiment, there are 3 values defined for the status in the table:

0—block unfilled
1—block just filled in this pass
2—block filled in a previous pass One skilled in the art would recognize that other marking schemes may be used.

In one embodiment, as part of an initialization procedure prior to the first pass, the data fill status of each block as maintained in the data fill status table is set to indicate the block is unfilled (e.g., set to 0). At the end of each pass and before the next pass starts, all the locations in the table with a number 1 that have been filled are changed to the number 2. During each pass, the status of the processed block is set to 1 immediately after it is filled. FIG. 5 shows the sequential passes and associated status table of the entire data filling procedure. Referring to FIG. 5, the left column shows the segmented passes of the data filling procedure on the foreground layer while the right column shows the status table. At the zero pass, the status table indicates that the data fill status for each block is unfilled. After the first pass, the data fill status of most of the blocks is still unfilled, while some of the blocks are shown to be filled (shown with a first type of crosshatching). After the second pass, those filled in the previous pass are shown with a second type of crosshatching that is different than the previous pass, while some blocks are shown as unfilled and others are shown as filled in this pass with the first type of crosshatching. Finally, in the last pass, all blocks are shown as filled in a previous pass using the second type of crosshatching.

Figure 4:
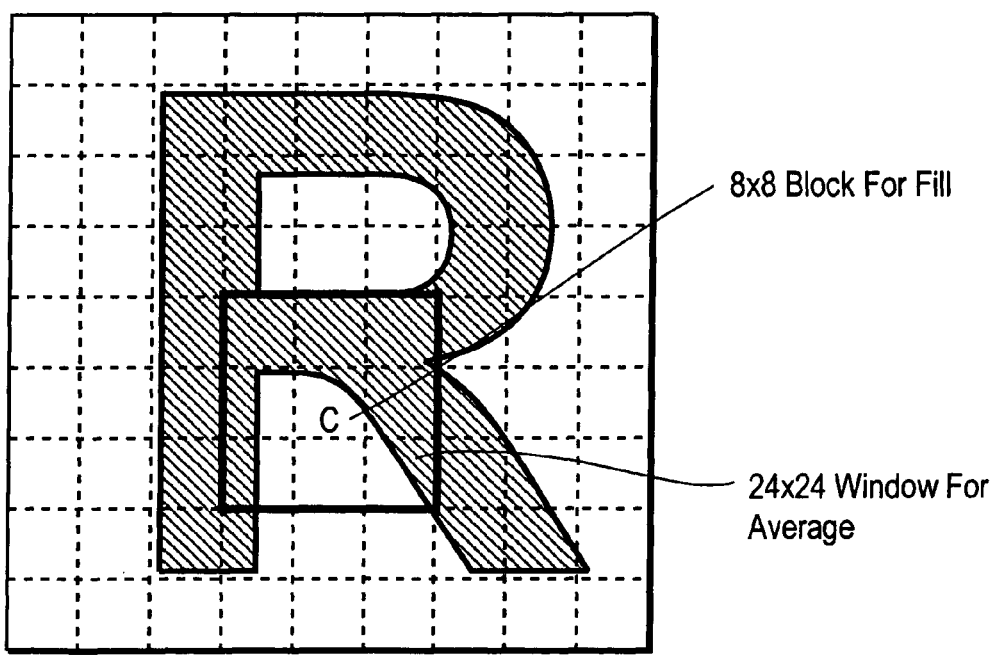
FIG. 4 illustrates a 24×24 window placed on the example of FIG. 3.

After initialization, a special first pass is performed. In the first pass, all the edge blocks and internal blocks are processed. For each internal block, the pixel values from the original image are copied and assigned to their corresponding pixel locations in the block and filled foreground or background. For each edge block, a larger window is selected having the current edge block at its center. In one embodiment, the window is 24×24 as shown in FIG. 4. Other window sizes may be used as mentioned above. These windows may be square in shape (e.g., 12×12) or rectangular in shape with the top and bottom being different in size to the two sides. The don't care pixels of the current block of the foreground are then assigned the value of the average of the care pixels in the window. The entries in data fill status corresponding to the current block are then set to indicate they have been filled in the current pass (e.g., 1). The mean value of the current block is saved in a memory buffer for later use. At the end of the first pass, all 1 values in the data fill status table are changed to 2.

After performing the special first pass, one or more subsequent passes are performed. In the subsequent passes, the values of the filled edge blocks and internal blocks are used to iteratively interpolate the don't care blocks. In each pass, for each unfilled block, the data fill status of each of its 8 neighboring blocks is first checked. If none of the 8 neighboring blocks is filled in a previous pass, then the data fill status of the current block remains unfilled, and it is skipped for the current pass. Otherwise, each pixel of the current block is assigned the average value of the means of all the neighboring blocks that are filled in the previous pass. The data fill status of the current block is set in the data fill status table to indicate the current block was filled in this pass (e.g., it is set to 1). The mean value of the current block is saved in the block mean buffer for use of the next pass. At the end of each pass, all 1 values in the data fill status table are changed to 2.

The iterative procedure terminates when all blocks of the foreground layer (and background layer) are filled.

Figure 9:
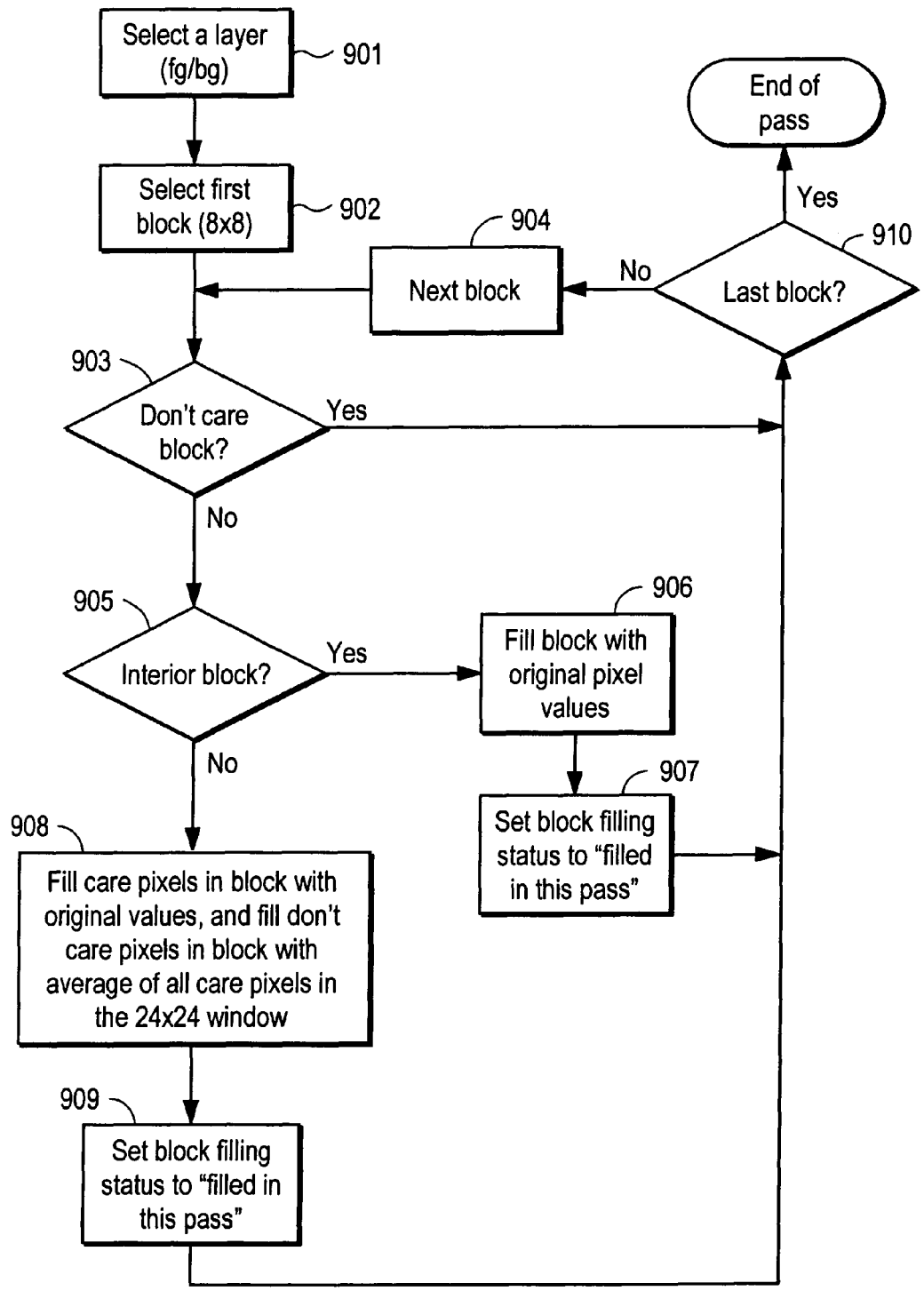
FIG. 9 is a flow diagram of one embodiment of a process for performing a first pass of a first data filling technique.

FIG. 9 is a flow diagram of one embodiment of a process for performing a first pass in one embodiment of a data filling process. This process follows pixel classification. The process is performed by processing logic that may comprise hardware (e.g., circuitry, dedicated logic, etc.), software (such as is run on a general purpose computer system or a dedicated machine), or a combination of both.

Referring to FIG. 9, the process begins by selecting a layer (processing block 901). The layer may be the foreground layer or the background layer. From the layer, processing logic selects first block (processing block 902). In one embodiment, the blocks are 8×8 blocks in the foreground or background layers. After selecting the block, processing logic determines if the block is a don't care block (processing block 903). If it is, the process transitions to processing block 910 where processing logic tests whether the current block is the last block. If it is, then the pass ends. If not, the process transitions to processing block 904 where processing logic selects the next block and the process continues at processing block 903.

At processing block 903, if the block is not a don't care block, processing logic tests whether the block is an interior block (processing block 905). If it is, processing logic fills the block with the original pixel values from the original image (processing block 906), sets the block filling status of the block to indicate that it was filled in this pass (processing block 907), and the process transitions to processing block 910 where the process continues.

If the block is not an interior block, processing transitions to processing block 908, where processing logic fills the care pixels in the block with the original pixels values from the original image and fills don't care pixels in the block with an average of all the care pixels in a window region larger than the block. In one embodiment, the window is a 24×24 window, although other windows may be selected. Thereafter, processing logic sets the block filling status to indicate that the block was filled in this pass (processing block 909), and the process transitions to processing block 910 where the process continues.

Figure 10:
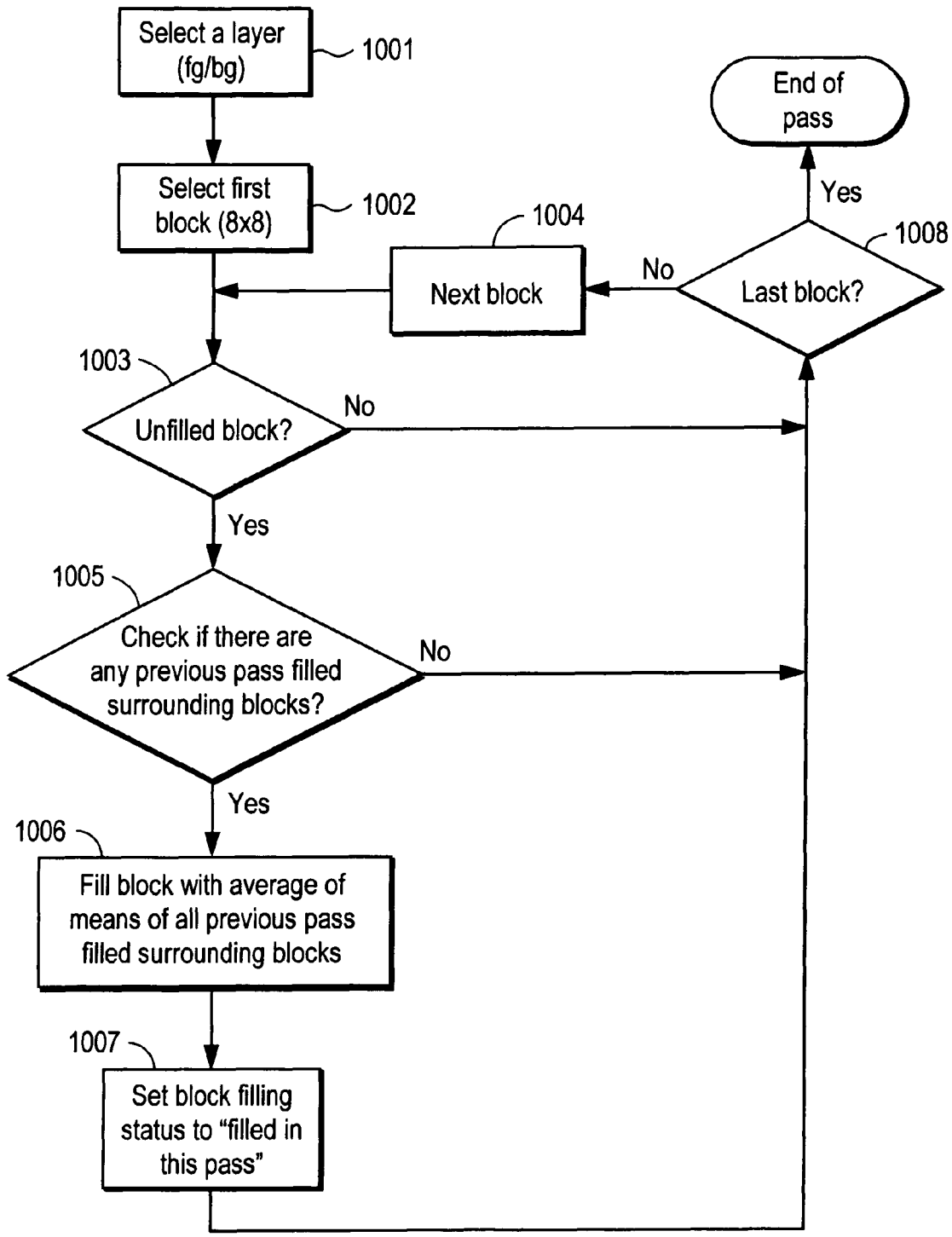
FIG. 10 is a flow diagram of one embodiment of a process for performing a subsequent pass in the first data filling technique.

FIG. 10 is a flow diagram of one embodiment of a process for performing a subsequent pass in the first embodiment of the data filling process. The process is performed by processing logic that may comprise hardware (e.g., circuitry, dedicated logic, etc.), software (such as is run on a general purpose computer system or a dedicated machine), or a combination of both.

Referring to FIG. 10, the process begins by selecting a layer (processing block 1001). In one embodiment, processing logic selects the foreground layer or the background layer. From the layer, processing logic selects a first block (processing block 1002). In one embodiment, the block is an 8×8 block. Other block sizes may be used.

Processing logic then tests whether the block is an unfilled block (processing block 1003). If it is not, the process transitions to processing block 1008 where processing logic tests whether the current block is the last block. If it is, the process ends. If not, the process transition to processing block 1004 where processing logic selects the next block and the process continues from processing block 1003. At processing block 1003, if the block is an unfilled block, processing logic checks if there are any of the surrounding blocks were filled in any previous pass (processing block 1005). If not, the process transitions to processing block 1008 where the process continues. If one or more of the surrounding blocks have been filled in a previous pass, processing logic fills the block with the average of the means of the values of all the surrounding blocks that have been filled in previous passes (processing block 1006) and sets the block filling status to indicated that the block was filled in the current pass (processing block 1007), and then the process transitions to processing block 1008 where the process continues.

An Alternative Data Filling Embodiment with Special Edge Treatments

A refinement to previous data filling process considers the edge effect in averaging for the block interpolation. The distinctions between the previous embodiment and this embodiment are described below.

Figure 6:
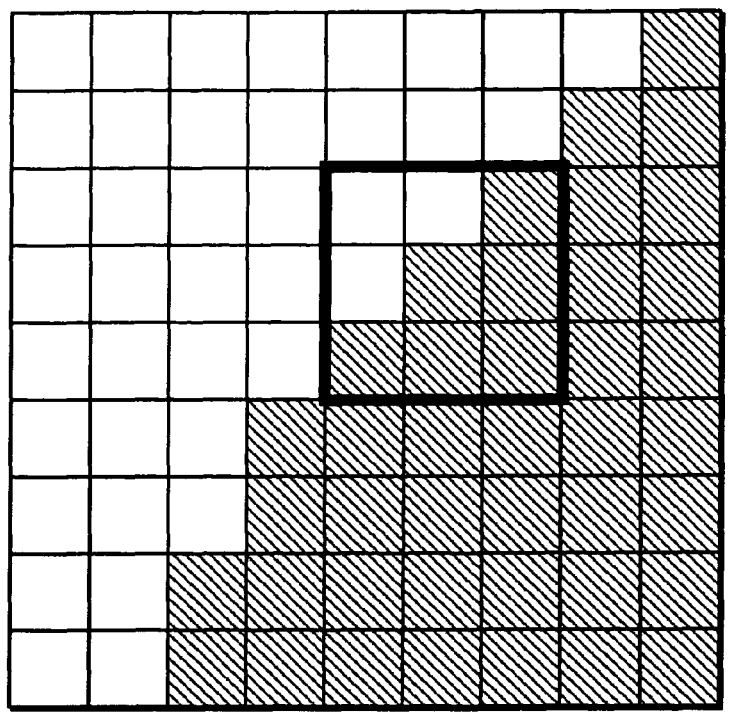
FIG. 6 illustrates edge pixel detection in a 3×3 neighborhood in the mask region.

With respect to block classification, as an initial operation, all edge pixels are detected in the binary mask image for use in special treatments in block interpolation. As shown in FIG. 6, a pixel is detected as an edge if it has the different mask value (i.e., black or white) from any of its neighbors in a window of predetermined size (e.g., a 3×3 window). In one embodiment, the block classification process categorizes blocks into five categories of block type that include an interior block with edge pixels, an interior block without edge pixels, a don't care block with edge pixels, a don't care block without edge pixels, and an edge block (with don't care, edge, and care pixels). The definitions of interior block, don't care block, and edge block are the same as described above.

Figure 7:
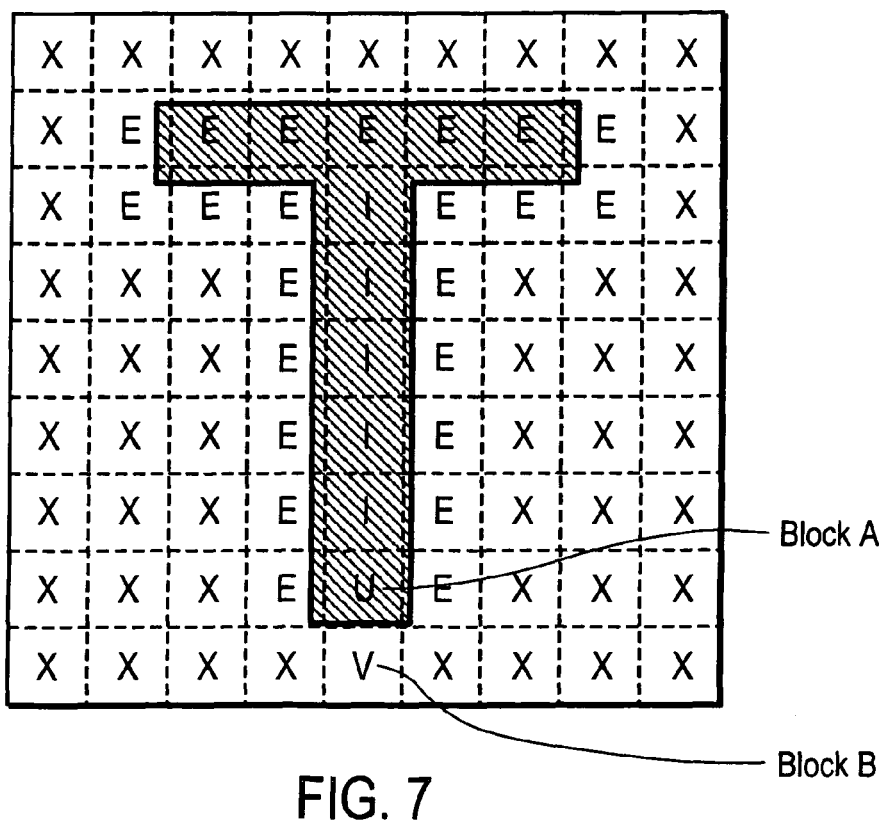
FIG. 7 illustrates an example for the five classification block types, including an interior block with edge pixels, an interior block without edge pixels, a don't care block with edge panels, a don't care block without edge pixels, and an edge block.

FIG. 7 illustrates an example for the 5 block types, where letter "U", "I", "V", "X", and "E" correspond to an interior block with edge pixels, an interior block without edge pixels, a don't care block with edge pixels, a don't care block without edge pixels, and an edge block, respectively. Notice that block A contains all care pixels, and block B contains all don't care pixels. However, they both contain edge pixels along the block boundary.

Figure 8:
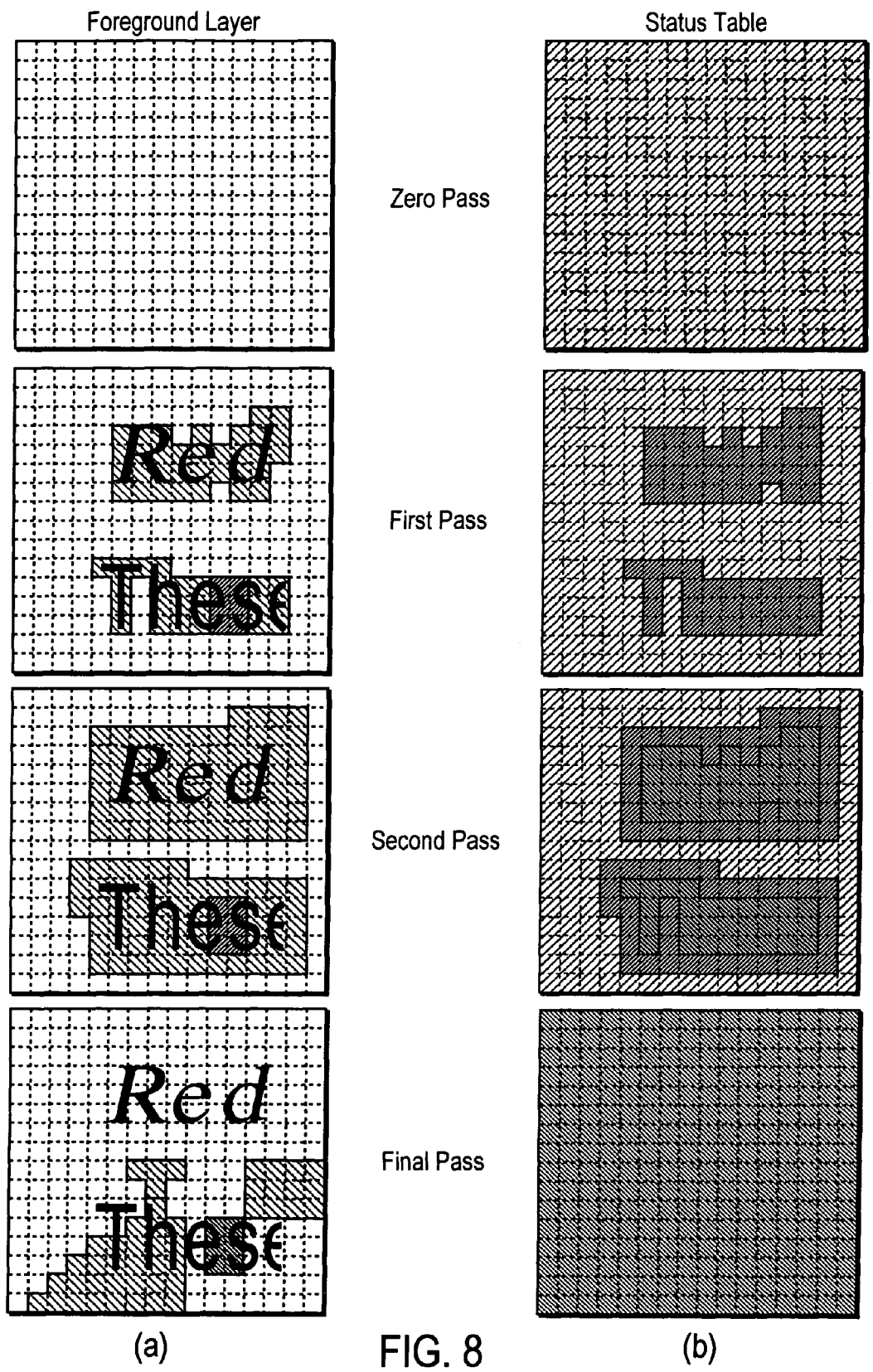
FIG. 8 illustrates the sequential passes and associated status table of the one embodiment of a data filling procedure with the special edge treatments.

As described above, a data filling status table is used to track the filling status of the blocks in the layer. The definition and updating procedure in this embodiment are the same as in embodiment described above. FIG. 8 shows the sequential passes and associated status table of the entire data filling procedure with the special edge treatments described below. As one can see, FIG. 8 shows that the region around edges is much smoother than that in FIG. 5, indicating that the ringing artifacts can be significantly reduced by applying the special edge treatments. Referring to FIG. 8, the left column shows the segmented passes of the data filling procedure on the foreground layer while the right column shows the status table. At the zero pass, the status table indicates that the data fill status for each block is unfilled. After the first pass, the data fill status of most of the blocks is still unfilled, while more of the blocks are shown to be filled (shown with a first type of crosshatching). After the second pass, those filled in the previous pass are shown with a second type of crosshatching that is different than the previous pass, while some blocks are shown as unfilled and others are shown as filled in this pass with the first type of crosshatching. Finally, in the last pass, all blocks are shown as filled in a previous pass using the second type of crosshatching.

With respect to the first special pass, the edge effect is considered in the block interpolation. In this pass, blocks with type "I", "E", "U", and "V" are processed. Specifically, when assigning values based on the pixel values in the window (e.g., the 24×24 window) as shown in FIG. 4, each edge pixel or don't care pixel in the current block is assigned the average value of all the care non-edge pixels in the window. This average value is saved in the block mean buffer. In the case where there are only edge pixels in the block and there are no non-edge care pixels in the window, the values assigned to all the care pixels in the current block are the values at the corresponding pixel locations in the original image. In other words, no averaging is performed. The data fill status is also set to indicate the block is unfilled (e.g., 0) for the current block.

In the subsequent passes, only one special treatment is considered. For each unfilled block, all the care pixels are kept unchanged if any, and all the other pixels (don't care pixels) in the block are interpolated the same way as in the embodiment described above. The average of the interpolated pixels is also saved in the block mean buffer.

Similarly, this data fill process terminates in the same manner as the embodiment described above.

Figure 11:
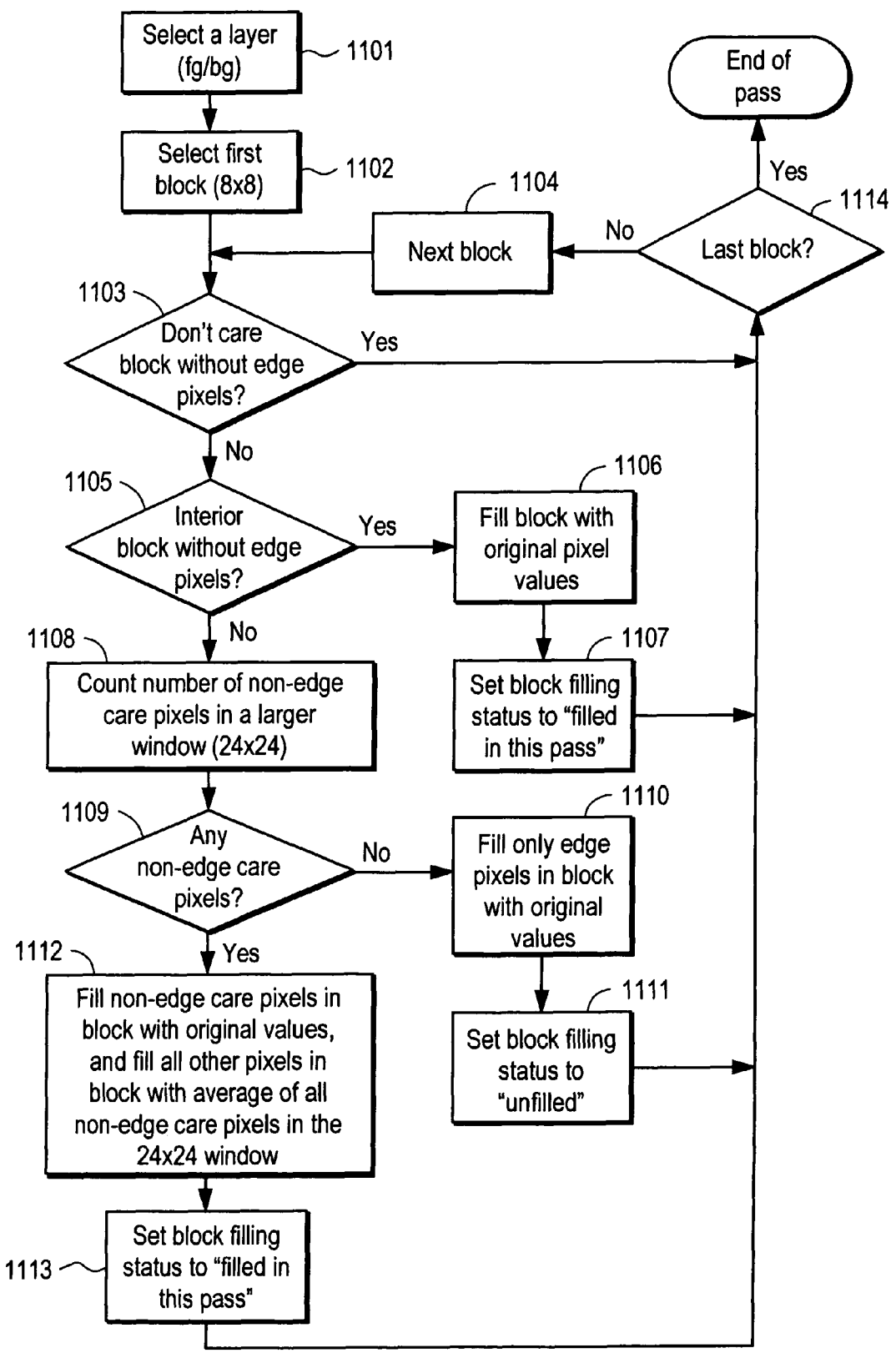
FIG. 11 is a flow diagram of one embodiment of a process for performing a first pass in a second data filling technique.

FIG. 11 is a flow diagram of one embodiment of a process for performing a first pass in another embodiment of data filling process. The process is performed by processing logic that may comprise hardware (e.g., circuitry, dedicated logic, etc.), software (such as is run on a general purpose computer system or a dedicated machine), or a combination of both.

Referring to FIG. 11, the process begins by processing logic selecting a layer (processing block 1101). Processing logic may select either the foreground layer or the background layer. Processing logic then selects a first block from the selected layer (processing block 1102). In one embodiment, processing logic selects an 8×8 block. However, other block sizes may be used.

After selecting a block, processing logic tests whether the current block is a don't care block without edge pixels (processing block 1103). If it is, the process transitions to processing block 1114 where processing logic tests whether the current block is the last block. If it is, the pass ends. If not, processing logic selects the next block (processing block 1105) and transitions to processing block 1103 where the process continues. If the block is not a don't care block without edge pixels, processing logic tests whether the current block is an interior block is without edge pixels (processing block 1104). If it is, processing logic fills the current block with the values from the corresponding pixel locations in the original image (processing block 1106) and sets the block filling status to indicated that the block was filled in this pass (processing block 1107) and the process transitions to processing block 1114 where the process continues.

If the current block is not an interior block without edge pixels, processing logic transitions to processing block 1108 where processing logic counts the number of non-edge care pixels in a larger window. In one embodiment, the window is 24 pixels×24 pixels. However, other window sizes may be used that are larger than the block size. After counting the number of non-edge care pixels in the larger window, processing logic tests whether there are any non-edge care pixels in the current block (processing lock 1109). If there are not, processing logic fills only the edge pixels in the current block with the values of the corresponding pixel locations in the original image (processing block 1110) and sets the block filling status to indicate that the current block is unfilled in this pass (processing block 1111), and the process transitions to processing block 1114 where the process continues. If there is one or more non-edge care pixels in the current block, processing logic fills the non-edge care pixels with the values of the corresponding pixel locations in the original image, fills all other pixels in the block with an average of all non-edge care pixels in the 24×24 window (processing block 1112) and sets the block filling status to indicate that the current block was filled in the pass (processing block 1113), and the process transitions to processing block 1114 where the process continues.

Figure 12:
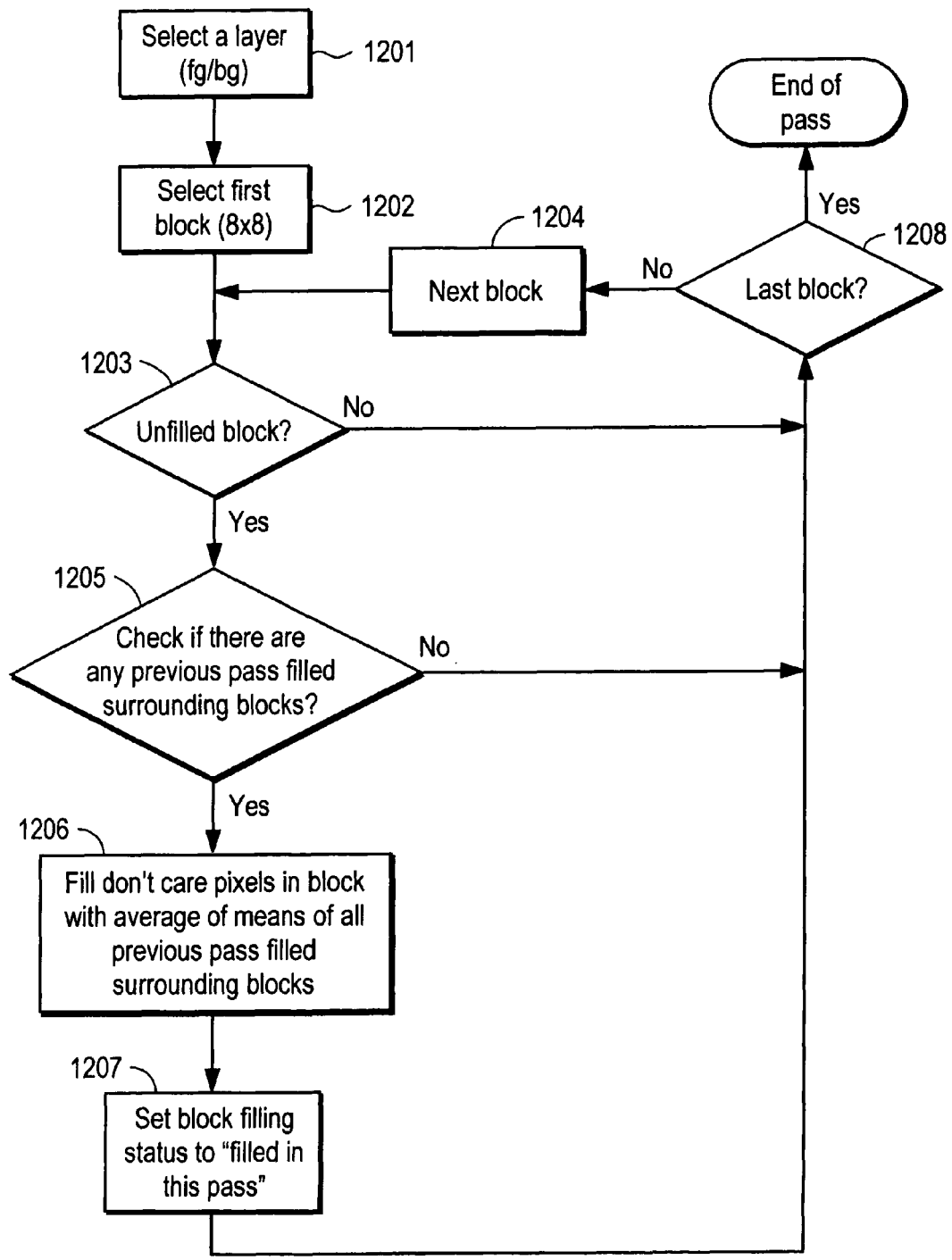
FIG. 12 is a flow diagram of one embodiment of a process for performing a subsequent pass in the second data filling technique.

FIG. 12 is a flow diagram of one embodiment of a process for performing a subsequent pass in another embodiment corresponding to FIG. 11 of the data filling process. The process is performed by processing logic that may comprise hardware (e.g., circuitry, dedicated logic, etc.), software (such as is run on a general purpose computer system or a dedicated machine), or a combination of both.

Referring to FIG. 12, the process begins by selecting a layer (processing block 1201). In one embodiment, processing logic may select the foreground layer or the background layer. From the layer, processing logic selects a first block (processing block 1202). In one embodiment, the block is an 8×8 block. Other block sizes may be used.

Processing logic then tests whether the current block is an unfilled block (processing block 1203). If it is not, the process transitions to processing block 1208 where processing logic tests whether the current block is the last block. If it is, the pass ends. If not, the process transitions to processing block 1204 where processing logic selects the next block and the process continues from processing block 1203. If the block is an unfilled block, processing logic checks if any of the surrounding block have been filled in a previous pass (processing block 1205). If not, process transitions to processing block 1208 where the process continues. If there is one or more surrounding blocks that have been filed during a previous pass, processing logic fills don't care pixels in the current block with the average of the means of all pixels previous pass filled surrounding blocks (processing block 1206) and sets the block filling status to "filled in this pass" (processing block 1207), and the process transitions the processing block 1208 where the process continues.

Alternative Embodiments

Final Number Pass Variation

As described above, the data filling process can take several passes to finish. For example, if there is only one edge block at the top row of the image (and no interior blocks), then one pass is needed for every row of blocks in the image in order to determine the contents of the block at the bottom left of the page. While these passes will be of low computational complexity, for some applications it is important not to cycle through memory multiple times. Thus, in one embodiment, after some fixed number of passes, a "final" pass can be performed. In the final pass, each block that has undetermined pixels is set to the block mean of pixel values of the nearest block with determined pixels. If there are more than one single nearest block, the block is assigned the average value of the block means of all the nearest blocks. In one embodiment, the gray level midpoint value is used in the final pass so that the nearest block with determined pixels need not be determined. In another embodiment, the block is assigned a predetermined value.

While using the nearest determined pixel block in the final pass does introduce some asymmetry into the image, this occurs far from any edge pixels, and thus will not affect the reconstructed values.

Rolling Buffer Variation

At times, it is valuable to operate in a fixed number of rows. MRC might be used with compression algorithms and segmentation algorithms that operate in a fixed size buffer. To do MRC with this data fill in a fixed sized buffer, some modifications are necessary. If a buffer that has the same width as that of the image and has N rows high is available, the data fill can be done as follows. (A row in this case is a row of blocks.)

The following procedure is repeated. The procedure is performed by processing logic that may comprise hardware (e.g., circuitry, dedicated logic, etc.), software (such as is run on a general purpose computer system or a dedicated machine), or a combination of both. Processing logic associated with the rolling buffer reads one row of blocks of the pixels and mask into buffers. The determination of edge blocks cannot be made for this row because the pixels below this row are unknown. Processing logic determines whether the blocks in the second row are edge blocks, interior blocks, or "don't care" blocks. In the 3rd to N−1st row, processing logic performs one pass of the normal assignment operation (e.g., determine the pixels for those blocks that are next to a block that was determined in a previous pass). For the Nth row of blocks, processing logic performs a "final" pass and writes out the Nth row of blocks to the output file. The operation to write the output is skipped the first N−1 times, because the blocks do not yet contain image pixels. Thereafter, processing logic moves all blocks up one row. A sample of the buffer contents is shown below:

---This row has a final pass done---(Nth row)
---This row does a regular pass---(N−1st row)
---This row does a regular pass---(3rd row)
---Determine edge, interior, don't care blocks---(2nd row)
---Read in. But don't process.------(1st row)

Of course, a fast implementation would use pointers to avoid the copying of pixels when the rows of blocks are moved up.

A potential problem of this approach is that an unbalanced color boundary could occur in between two text regions. For example, if the top row contains a text region, say A, and the bottom row or somewhere near it contains another text region, say B, with different foreground color, then the rolling buffer approach would end up filling most don't care regions in between region A and B with only the color of region A. This is because region A and region B are not simultaneously growing under the rolling buffer approach (i.e., B always grows after A, therefore A always dominates.) To avoid this problem, in one embodiment, some additional passes are made to update the data fill in the don't care region that is in between A and B but close to B, which has already been filled by the color of region A. This would increase some computational complexity.

Combining Data Filling and Image Scaling

As shown in FIG. 2, the foreground and background layers are optionally scaled (typically downsampled) following the data filling process. In this case, the image scaling and data filling operations are independent of each other. While the current data filling method may operate in this manner, improved performance can be obtained when the data fill operation is combined with the scaling operation.

Figure 14:
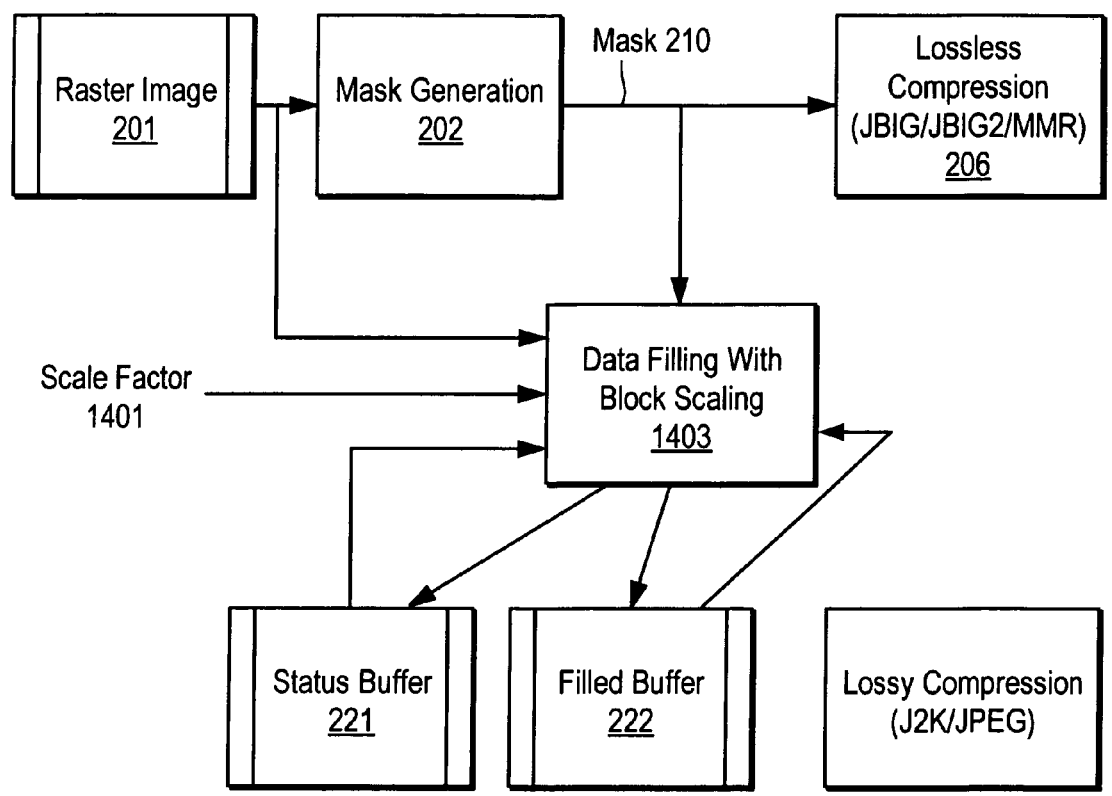
FIG. 14 is a block diagram of an alternative embodiment of a compound document compressor.

FIG. 14 is a block diagram of such a processor. To combine the data file operation with scaling, a buffer 222 for the filled image is allocated at the scaled size rather than the original image size. Because the scaling is usually downscaling, this will be a smaller buffer. When the "interior pixels" (i.e. non-edge care pixels) are copied to filled buffer 222 they are scaled based on scaling factor 1401. This scaling operation only operates on a block of data at a time. When don't care pixels are determined, no scaling is necessary, the entire scaled block is simply filled with the average value.

When scaling is being performed, in one embodiment, the block size is changed. For example, if downscaling by a factor of 3 being used (a very common factor), it is useful to use a block size of 9 by 9. In this way, each block corresponds to a 3×3 block of scaled pixels.

Combining scaling and data fill has a number of advantages. For example, the combined scaling and data fill reduces computational complexity, and the data fill algorithm does not need to determine more pixels than will be used by the compression system, scaling is not needed for pixels that are filled in (at least 50% of the pixels will be filled in with some average value when both the foreground and background are considered). The block size can be chosen based on scaling factor. In addition, the quality of foreground and background can be improved because the system can be optimized for quality by including scaling, rather than optimizing them independently.

The description herein refers to use of a foreground, background, and mask, but in some compression systems multiple layers are used. In the case of multiple layers, reconstruction might proceed as follows: first the current image is set to the background image. Then for each additional layer, there is a mask object and an image object. Pixels from the image object are blended into the current image based on the mask object. This is described in detail in the JPM standard (ISO/IEC 15444-6).

For this disclosure, it is important to realize that the mask that corresponds with each image object is the one that is used to determine "care" and "don't care" and "edge pixels." For the background image, there is no mask stored in the compressed file, in fact, the don't care pixels is determined by combining the masks from all other layers (any pixel that is a care pixel in one layer, is not a care pixel in the background).

It is also possible to use a grayscale mask in some layered document compression schemes including JPM. In this case the two layers are blended in proportion to the value of the mask. In order to determine care and don't care pixels for purpose of determining how to fill pixels, it is necessary to create a binary mask. A binary mask can be created from a grayscale mask in several ways known to those skilled in the art. The simplest method is to threshold the mask, i.e., convert all values above some value to 1 and all others to zero. Note that it may be desirable to use different masks for the foreground and background. For example, it may be desirable when the grayscale mask has a middle value of say 128, for the pixel to be a "care" pixel in both the foreground and the background, this will lead to high quality. Alternatively, a mask pixel with a middle value of 128, might be considered "don't care" in both the foreground and the background, this will lead to high compression.

An Example of a Computer System

Figure 13:
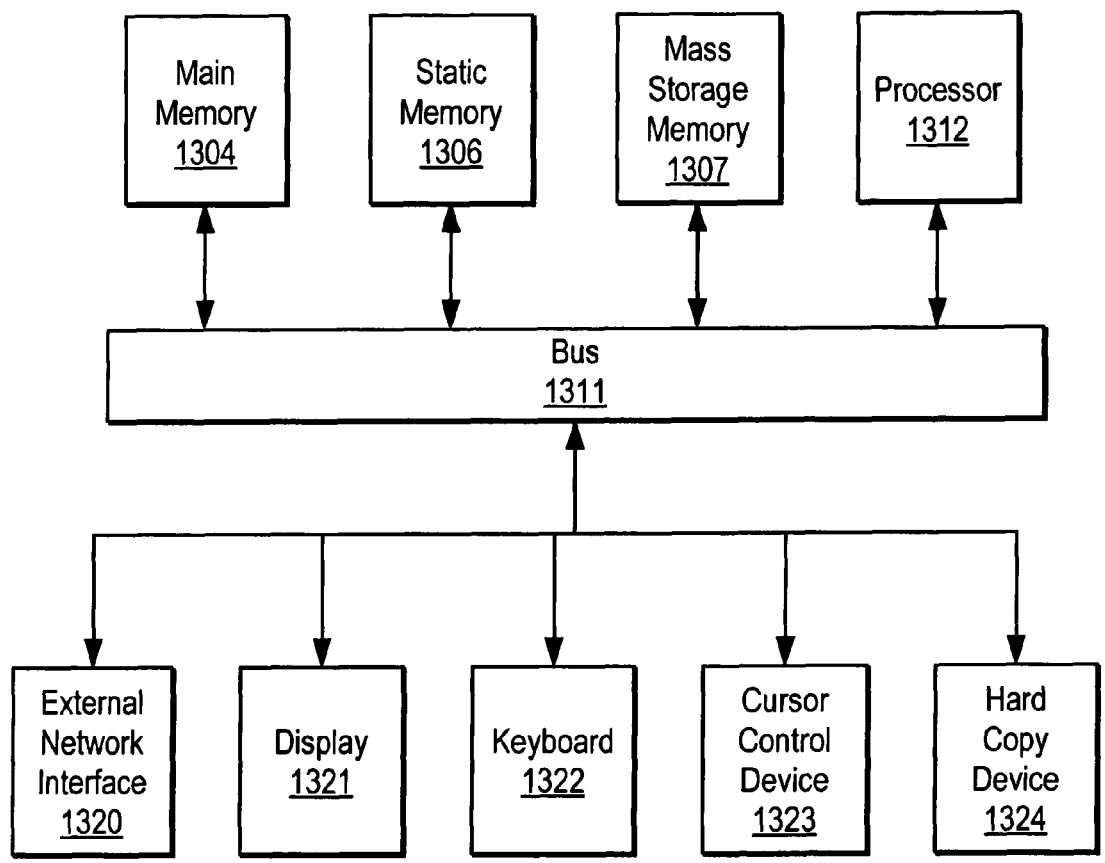
FIG. 13 is a block diagram of an exemplary computer system that may perform one or more of the operations described herein.

FIG. 13 is a block diagram of an exemplary computer system that may perform one or more of the operations described herein. Referring to FIG. 13, computer system 1300 may comprise an exemplary client or server computer system. Computer system 1300 comprises a communication mechanism or bus 1311 for communicating information, and a processor 1312 coupled with bus 1311 for processing information. Processor 1312 includes a microprocessor, but is not limited to a microprocessor, such as, for example, Pentium™, PowerPC™, Alpha™, etc.

System 1300 further comprises a random access memory (RAM), or other dynamic storage device 1304 (referred to as main memory) coupled to bus 1311 for storing information and instructions to be executed by processor 1312. Main memory 1304 also may be used for storing temporary variables or other intermediate information during execution of instructions by processor 1312.

Computer system 1300 also comprises a read only memory (ROM) and/or other static storage device 1306 coupled to bus 1311 for storing static information and instructions for processor 1312, and a data storage device 1307, such as a magnetic disk or optical disk and its corresponding disk drive. Data storage device 1307 is coupled to bus 1311 for storing information and instructions.

Computer system 1300 may further be coupled to a display device 1321, such as a cathode ray tube (CRT) or liquid crystal display (LCD), coupled to bus 1311 for displaying information to a computer user. An alphanumeric input device 1322, including alphanumeric and other keys, may also be coupled to bus 1311 for communicating information and command selections to processor 1312. An additional user input device is cursor control 1323, such as a mouse, trackball, trackpad, stylus, or cursor direction keys, coupled to bus 1311 for communicating direction information and command selections to processor 1312, and for controlling cursor movement on display 1321.

Another device that may be coupled to bus 1311 is hard copy device 1324, which may be used for marking information on a medium such as paper, film, or similar types of media. Another device that may be coupled to bus 1311 is a wired/wireless communication capability 1325 to communication to a phone or handheld palm device.

Note that any or all of the components of system 1300 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    receiving an image and a mask associated with the image;
    classifying blocks of at least one of a foreground layer and a background layer, wherein classifying blocks with three different classes comprises identifying each block that has only care pixels, each block that contains only don't care pixels, and each block that contains an edge created by at least one care pixel being adjacent to at least one don't care pixel; and
    performing a block-based, iterative multi-pass data filling process to fill a layer as part of compound document compression, wherein performing a block-based iterative multi-pass data filling process comprises, for each block during a first pass:
        filling each block in the layer classified as containing only care pixels with the pixel values of the corresponding block in the image;
        filling don't care pixels in each block classified as containing an edge with a value based on an average of care pixels in a window containing said each block, where the window is larger than the block size; and
        filling care pixels in each block classified as containing an edge with the pixel values of the corresponding pixels in the corresponding block in the image.

2. The method defined in claim 1 wherein performing a block-based iterative multi-pass data filling process comprises determining a value for each of one or more blocks of the layer based on pixel values of a window containing said each block, where the window is larger than the block size.

3. The method defined in claim 2 wherein the block size is 8 pixels by 8 pixels and the window size is 24 pixels by 24 pixels.

4. The method defined in claim 2 wherein the window size is rectangular in shape with at least one side that is not a multiple of the block size.

5. The method defined in claim 4 wherein the window size is selected based on one or more of a group consisting of: a compression algorithm for use in the compound document compression; a transform used in the compound document compression; and content of the image.

6. The method defined in claim 1 further comprising classifying blocks of at least one of a foreground layer and a background layer.

7. The method defined in claim 6
    wherein classifying blocks comprises classifying pixels by,
        examining a window centered around each pixel,
        determining if any pixels in the window have a different value than said each pixel, and
        classifying said each pixel as an edge if any pixels around said each pixel in the window have a different value than said each pixel.

8. The method defined in claim 7 wherein the window comprises a 3×3 window.

9. The method defined in claim 6 wherein classifying blocks comprises classifying pixels by mask values.

10. The method defined in claim 6 wherein classifying blocks with three different classes comprises identifying each block that has only care pixels, each block that contains only don't care pixels, and each block that contains an edge created by at least one care pixel being adjacent to at least one don't care pixel.

11. The method defined in claim 1 wherein performing a block-based iterative multi-pass data filling process further comprises performing a subsequent pass for each unfilled block that includes:
    maintaining said each unfilled block as unfilled if none of a set of neighboring blocks is filled in a preceding pass; and
    assigning each pixel of said each unfilled block with a value consisting of an average of the means of neighboring blocks that had been filled in one or more preceding passes.

12. The method defined in claim 11 further comprising:
    repeating performance of the subsequent pass for a set number of passes; and
    after performing the set number of passes, assigning each undetermined pixel in one block in the layer to a block mean of pixel values in another block nearest to the one block and a midpoint of pixel values in the one block.

13. The method defined in claim 1 wherein performing the block-based iterative multi-pass data filling process comprises maintaining a data fill status table to keep track of filling status of each block in each pass of the multi-pass data filling process.

14. The method defined in claim 1 wherein the mask is a binary mask that is generated from a gray level mask.

15. The method defined in claim 1 where performing the block-based, iterative multi-pass data filling process comprises adapting a block size based on one or more of a group consisting of which pass is being performed and content of the image corresponding to the block.

16. The method defined in claim 1 further comprising performing scaling combined with the block-based, iterative multi-pass data filling process by which a buffer for a scaled-sized version of a filled image is used that has a size less than the size of the image.

17. A method comprising:
receiving an image and a mask associated with the image;
classifying blocks of at least one of a foreground layer and a background layer, wherein classifying blocks with five different classes comprises identifying each block that has only care pixels with edge pixels, each block that has only care pixels without edge pixels, each block that contains only don't care pixels with edge pixels, each block that contains only don't care pixels without edge pixels, and each block that contains an edge created by at least one care pixel being adjacent to at least one don't care pixel; and
performing a block-based, iterative multi-pass data filling process to fill a layer as part of compound document compression.

18. The method defined in claim 17 wherein performing a block-based iterative multi-pass data filling process comprises, for each block during a first pass:
assigning each edge pixel or don't care pixel in each block classified as containing only care pixels with edge pixels, containing only care pixels without edge pixels, containing only don't care pixels with edge pixels, or containing an edge created by at least one care pixel being adjacent to at least one don't care pixel with a value based on an average of care non-edge pixels in a window containing said each block, where the window is larger than the block size; and
assigning each care pixel in each block that contains only don't care pixels without edge pixels to the corresponding pixel values of the corresponding block in the image.

19. The method defined in claim 18 wherein performing a block-based iterative multi-pass data filling process further comprises performing a subsequent pass for each unfilled block that includes:
maintaining said each unfilled block as unfilled if none of a set of neighboring blocks is filled in an immediately preceding pass; and
assigning each pixel of said each unfilled block with a value consisting of an average of the means of neighboring blocks that had been filled in the immediately preceding pass.

20. The method defined in claim 19 further comprising repeating performance of the subsequent pass for each unfilled block until all blocks of the layer have been filled.

21. The method defined in claim 19 further comprising:
repeating performance of the subsequent pass for a set number of passes; and
after performing the set number of passes, assigning each undetermined pixel in one block in the layer to a value in a group consisting of an average of pixels values in another block nearest to the one block and a gray level midpoint value.

22. A method comprising:
receiving an image and a mask associated with the image; and
performing a block-based, iterative multi-pass data filling process to fill a layer as part of compound document compression, wherein performing the block-based, iterative multi-pass data filling process comprises:
reading a first row of blocks of pixels and their associated mask into a buffer;
determining edge, interior and don't care blocks for a second row of blocks;
determining one pass for each subsequent row up to, but not including, the final row in which a determination of whether pixels for the blocks are located next to a block that was determined in a previous pass; and
performing a final pass on the last row.

23. A non-transitory computer readable storage medium having instructions stored thereon which, when executed by a system, cause the system to perform a method comprising:
receiving an image and a mask associated with the image;
classifying blocks of at least one of a foreground layer and a background layer, wherein classifying blocks with three different classes comprises identifying each block that has only care pixels, each block that contains only don't care pixels, and each block that contains an edge created by at least one care pixel being adjacent to at least one don't care pixel; and
performing a block-based, iterative multi-pass data filling process to fill a layer as part of compound document compression, wherein performing a block-based iterative multi-pass data filling process comprises, for each block during a first pass:
filling each block in the layer classified as containing only care pixels with the pixel values of the corresponding block in the image;
filling don't care pixels in each block classified as containing an edge with a value based on an average of care pixels in a window containing said each block, where the window is larger than the block size; and
filling care pixels in each block classified as containing an edge with the pixel values of the corresponding pixels in the corresponding block in the image.

24. The computer readable storage medium defined in claim 23 wherein performing a block-based iterative multi-pass data filling process comprises determining a value for each of one or more blocks of one layer based on pixel values of a window containing said each block, where the window is larger than the block size.

25. An apparatus comprising:
a memory; and
a processor coupled with the memory to execute
a mask generator to generate a mask, and
a multi-pass data filling unit to
receive an image and a mask associated with the image,
classify blocks of at least one of a foreground layer and a background layer,
wherein blocks are classified with three different classes comprises identifying each block that has only care pixels, each block that contains only don't care pixels, and each block that contains an edge created by at least one care pixel being adjacent to at least one don't care pixel, and
perform a block-based, iterative multi-pass data filling process to fill a layer as part of compound document compression, wherein performing a block-based iterative multi-pass data filling process is performed where, for each block during a first pass:
each block in the layer classified as containing only care pixels is filled with the pixel values of the corresponding block in the image,
don't care pixels in each block classified as containing an edge are filled with a value based on an average of care pixels in a window containing said each block, where the window is larger than the block size, and
care pixels in each block classified as containing an edge are filled with the pixel values of the corresponding pixels in the corresponding block in the image.

* * * * *